United States Patent
Herz et al.

(10) Patent No.: US 7,177,608 B2
(45) Date of Patent: Feb. 13, 2007

(54) PERSONAL SPECTRUM RECORDER

(75) Inventors: William S. Herz, Hayward, CA (US); Michael A. Polatnick, San Jose, CA (US)

(73) Assignee: Catch a Wave Technologies, Hayward, CA (US)

(*) Notice: Subject to any disclaimer, the term of this patent is extended or adjusted under 35 U.S.C. 154(b) by 492 days.

(21) Appl. No.: 10/386,045

(22) Filed: Mar. 10, 2003

(65) Prior Publication Data

US 2003/0228855 A1  Dec. 11, 2003

Related U.S. Application Data

(60) Provisional application No. 60/363,133, filed on Mar. 11, 2002.

(51) Int. Cl.
*H04B 1/18* (2006.01)

(52) U.S. Cl. .................. 455/185.1; 455/186.1; 455/162.1; 455/161.1; 375/240.25; 375/240.26

(58) Field of Classification Search ............. 455/186.1, 455/185.1, 184.1, 183.2, 187.1, 188.1, 191.1, 455/166.2, 167.1, 168.1, 550.1, 575.1, 561, 455/424, 425, 456.5, 456.6, 183.1, 3.01–3.06, 455/21, 17, 18, 59, 553.1–556.2, 161.2, 161.1, 455/434; 375/316, 340, 219, 232, 260, 229, 375/230, 231, 240.25, 240.26; 370/210, 370/484, 215, 330, 336, 337, 345, 350
See application file for complete search history.

(56) References Cited

U.S. PATENT DOCUMENTS

| | | | |
|---|---|---|---|
| 4,266,243 A | 5/1981 | Shutterly | |
| 4,308,558 A | 12/1981 | Hernandez et al. | |
| 4,416,024 A | 11/1983 | Ugari et al. | |
| 4,450,477 A | 5/1984 | Lovett | |
| 4,608,456 A | 8/1986 | Paik et al. | |
| 4,683,586 A | 7/1987 | Sakamoto et al. | |
| 4,752,953 A | 6/1988 | Paik et al. | |
| 4,788,543 A | 11/1988 | Rubin | |
| 5,131,020 A | 7/1992 | Liebesny et al. | |
| 5,210,611 A | 5/1993 | Yee et al. | |
| 5,295,154 A | 3/1994 | Meier et al. | |
| 5,371,551 A | 12/1994 | Logan et al. | |
| 5,406,626 A | 4/1995 | Ryan | |

(Continued)

FOREIGN PATENT DOCUMENTS

GB        2 267 629 A        8/1993

*Primary Examiner*—Edward F. Urban
*Assistant Examiner*—Charles Chow

(57) ABSTRACT

A system and method is disclosed for a personal radio recorder. The personal radio recorder allows for random access of communication signals by identifying a channel and time. The personal radio recorder is capable of concurrent reception, storage and playback of a complete spectrum of individual communication signals. A wide-band signal is received, and concurrently demodulated into a plurality of individual communication signals. These audio signals are identified by channel and time. Individual signals may be simultaneously played, paused, or stored for later playback. Compression may be used to make efficient use of storage. Storage may be fixed, removable, or a combination of both. The system is also capable of storing signals that are digitally formatted, and is compatible with existing analog or digital playback devices. The personal radio recorder may playback multiple channels of communications data, either previously recorded or currently broadcast, to multiple output stages at the same time.

10 Claims, 13 Drawing Sheets

U.S. PATENT DOCUMENTS

| | | |
|---|---|---|
| 5,444,697 A | 8/1995 | Leung et al. |
| 5,524,051 A | 6/1996 | Ryan |
| 5,590,195 A | 12/1996 | Ryan |
| 5,642,153 A * | 6/1997 | Chaney et al. ............... 725/40 |
| 5,751,806 A | 5/1998 | Ryan |
| 5,761,190 A | 6/1998 | Yamauchi et al. |
| 5,790,423 A | 8/1998 | Lau et al. |
| 5,809,472 A | 9/1998 | Morrison |
| 5,815,671 A | 9/1998 | Morrison |
| 5,848,097 A * | 12/1998 | Carney et al. ............. 375/219 |
| 5,872,712 A | 2/1999 | Brenneman et al. |
| D409,193 S | 5/1999 | Mott et al. |
| 5,926,624 A | 7/1999 | Katz et al. |
| 5,956,629 A | 9/1999 | Morrison |
| 5,979,724 A | 11/1999 | Loewenthal, Jr. et al. |
| 6,088,455 A | 7/2000 | Logan et al. |
| 6,158,005 A | 12/2000 | Bharathan et al. |
| 6,170,060 B1 | 1/2001 | Mott et al. |
| 6,253,237 B1 | 6/2001 | Story et al. |
| 6,330,334 B1 | 12/2001 | Ryan |
| D456,350 S | 4/2002 | Mott et al. |
| 6,480,961 B2 | 11/2002 | Rajasekharan et al. |
| 6,490,432 B1 | 12/2002 | Wegener et al. |
| 6,526,264 B2 | 2/2003 | Sugar et al. |
| 6,560,651 B2 | 5/2003 | Katz et al. |
| 6,785,656 B2 * | 8/2004 | Patsiokas et al. ........... 704/500 |
| 2002/0035573 A1 | 3/2002 | Black et al. |
| 2002/0055343 A1 * | 5/2002 | Stetzler et al. .............. 455/260 |
| 2002/0181684 A1 | 12/2002 | Logan |
| 2003/0008613 A1 | 1/2003 | Karr et al. |
| 2003/0009772 A1 | 1/2003 | Karr |
| 2003/0083083 A1 | 5/2003 | Karr |
| 2003/0093790 A1 | 5/2003 | Logan et al. |
| 2003/0119469 A1 | 6/2003 | Karr et al. |
| 2003/0163823 A1 | 8/2003 | Logan et al. |
| 2003/0165200 A1 * | 9/2003 | Pugel ........................ 375/316 |
| 2005/0144650 A1 * | 6/2005 | Tu et al. ..................... 725/131 |

* cited by examiner

File Manager Data Types/Fields

| Content | Origin of Content | Data | Origin of Data |
|---|---|---|---|
| Internally Compressed | Analog RF transmission | Firmware | Originally stored on HDD and updated through connection to PC |
| Uncompressed audio | Analog RF transmission or ripped from CD | Embedded metadata | Extracted from sub-carrier or sub-channel. In case of digital transmission, data is extracted consistent with existing data extraction |
| Externally Compressed audio | Digital radio delivered content (XM, HD Radio, etc.) | Compression Type | User defaults or user defines. If file is imported, file could be transcoded or kept as natively compressed. |
| Generic File Transfers | PC, PDA, Cell Phone, Digital Camera etc. | Time and date of acquisition | RTC communicates with file system |
| | | Source of acquisition (PRR, import, etc.) | Host processor identifies if content is captured from front end, acquired through connection, or from removable media |
| | | Journal of activity | User keystrokes, commands, and content handling is recorded onto HDD |
| | | User defined name | User enters name, labels, and metadata via control panel, keystrokes, UI, or voice command |
| | | Playlist parent | User defines and organizes through control panel, keystrokes, UI, voice command, or through PC/PDA connection |

Figure 7b(1)

| | | |
|---|---|---|
| | Song Title | User enters name, labels, and metadata via control panel, keystrokes, UI, or voice command. Alternatively, time stamp can be correlated to radio station play list when PRR is connected to PC/PDA |
| | Artist | User enters name, labels, and metadata via control panel, keystrokes, UI, or voice command. Alternatively, time stamp can be correlated to radio station play list when PRR is connected to PC/PDA |
| | Song genre | User enters name, labels, and metadata via control panel, keystrokes, UI, or voice command. Alternatively, time stamp can be correlated to radio station play list when PRR is connected to PC/PDA |
| | Station frequency | File Manager creates 2x2 matrix of Time Stamp and Channel. Channel is derived from system's processing intelligence of what content is in which frequency bin. |

Figure 7b(2)

| | | |
|---|---|---|
| | Station call letters | File Manager creates 2x2 matrix of Time Stamp and Channel. Channel is derived from system's processing intelligence of what content is in which frequency bin. Alternatively, user could provide input, or frequency could be correlated to call letters based on PC/PDA connection (internet) or pre-stored data base on HDD |
| | Bookmark | User denotes through control panel, keystrokes, UI, or voice command beginning and ending |
| | Anti-Bookmark | User denotes through control panel, keystrokes, UI, or voice command beginning and ending |
| | GPS location | External GPS system must provide data to Host Processor |
| | User protected | User denotes through control panel, keystrokes, UI, or voice command |
| | Digital Rights Management | Dictated by embedded metadata |
| | Song duration | Host processor calculates based on RTC, or bookmark. Could also be extracted from metadata (if present) |
| | User set up data | User specifies throuh control panel, keystrokes, UI, voice command, or through PC/PDA connection |

Figure 7b(3)

PERSONAL SPECTRUM RECORDER

RELATED APPLICATIONS

This application claims priority under 35 U.S.C. §119(e) to U.S. Provisional Application Ser. No. 60/363,133, dated Mar. 11, 2002, entitled "Personal Time Shift Radio Recorder (PRR)/Time Shift Radio," the contents of which are herein incorporated by reference.

BACKGROUND OF THE INVENTION

1. Field of the Invention

The present invention relates to the concurrent capture and demodulation of a full region of spectrum of selectable radio frequencies typically containing audio and communication signals for time shifting, random access of individual channels or time frames, digital recording and advanced content management.

2. Description of Related Art

Currently, state of the art audio systems provide live playback of audio broadcast signals. These audio systems accept a wide-band signal and selectively demodulate a single channel of the broadcast audio spectrum for playback. For example, a frequency modulated ("FM") stereo tuner receives a radio frequency band described as the FM band. In the United States, this band includes radio frequency energy from 87 MHz to 108 MHz, which includes approximately 100 channels separated by 200 kHz. A listener can adjust the FM tuner to receive any one of the channels of audio signals for playback at one time. For instance, the listener may adjust his FM tuner to receive 88.1 MHz., or 88.3 MHz. The FM tuner will then demodulate the baseband audio signal present at 88.1 MHz., and allow the listener to hear the live audio broadcast present at that frequency.

Many of these channels provide news, weather or traffic information broadcasts that are helpful to listeners. For instance, a listener may hear a traffic information broadcast while driving to work. The broadcast allows the listener to modify his driving route to minimize travel delays due to traffic. Similarly, weather broadcasts allow listeners to adjust their activities according to the current or forecast weather. Finally, listeners can hear news broadcast to stay informed of current events.

Additionally, some radio stations broadcast data along with the audio. This data can be extracted and stored by certain state of the art systems and used to display textual information relating to the content of the audio broadcast. This textual information may provide the identity of a broadcast, advertising information, or other pertinent information about the broadcast. This information can be used in a variety of ways by existing systems.

However, a problem with state of the art audio systems is that such systems require listeners to adjust the audio system tuner to the station at the time the broadcast is occurring. Moreover, they must listen to the broadcast as it occurs. For example, if the listener has adjusted his tuner to channel A, and the traffic report is occurring on channel B, the listener will miss the traffic report completely. Another problem with such systems is that if the listener is not listening to the broadcast, no practical method exists for accessing the missed broadcast for later playback. For example, if the listener turns on his state of the art audio system at 8:00 AM, but the traffic broadcast occurred at 7:50 AM, the listener will have completely missed the traffic broadcast. Yet another problem with such systems is that if the listener hears the end of a news broadcast and wishes to hear a missed portion, no method exists for replaying the missed portion. Moreover, if the listener becomes interrupted while listening to an audio broadcast, the listener cannot simply replay the broadcast.

At present, the state of the art audio systems are capable of recording communications broadcasts. However, a problem with such systems is that a communications system with one tuner can only record one communications channel at any one time. With such systems a listener must determine in advance what channel to record. Moreover, the listener would have to set the system to record a particular channel in advance of the broadcast. These requirements make the state of the art audio systems impractical for random access of audio broadcasts on multiple channels, past and present.

If, however, a method existed to automatically receive and store the communication broadcast, the listener could playback portions of broadcast that were missed. Similarly, if multiple channels could be received and stored simultaneously, the listener would not need to be concerned with tuning to a particular communications channel. Further, if the listener is interrupted, the listener could pause the broadcast and resume listening later without missing any portion of the broadcast. Additionally, a user could randomly select any broadcast for playback from the group of broadcasts occurring presently or in the past, subject to practical memory considerations.

Therefore, a need exists for listeners to be able to randomly access broadcasts that have already occurred or are occurring. There is a need for a system for capturing multiple communications channels simultaneously, storing such channels individually, and allowing random access and manipulation of such signals at later times.

SUMMARY OF THE INVENTION

The present invention is directed to a personal spectrum recorder, e.g. a personal radio recorder that provides random access to broadcasts on multiple channels occurring presently or in the past. The present invention also allows for managing communications content over one or more regions of entire spectrums by receiving, demodulating and processing an entire band, or multiple bands, of communications channels concurrently. The present invention receives wideband signals, which comprise one or more entire spectrums of radio frequency energy. The present invention extracts communications channels from the wide-band signals and provides for automatic storage for multiple communications channels. The present invention may playback single or multiple channels simultaneously to a number of different output devices.

The system of the present invention comprises a signal acquisition stage, a channel extractor, a file management system, and one or more output stages. The signal acquisition stage receives a wide-band signal from an antenna and converts the wide-band signal into a high-bandwidth digital data stream. The channel extractor converts the high-bandwidth digital data stream into two or more individual channels. The file management system identifies the two or more individual channels according to channel and time. The file management system may also store the two or more individual channels. Storage may be provided by a live pause buffer for the most recent predetermined time-frame of all the channels, and a content archive for longer-term storage. The file management system may then playback one or more individual channels through various output stages. In this manner, one or more users can simultaneously playback different channels through separate output stages.

In one embodiment of the present invention, the signal acquisition stage comprises an analog signal preconditioner, an analog correction block, a wide-band analog to digital converter ("ADC"), and a digital correction block. The analog signal preconditioning stage amplifies and filters a wide-band signal received from an antenna. Amplification may be achieved through either fixed or variable gain elements, or a combination of both. Control signals for variable gain elements may be provided by external sources. These sources may be generated from measurements of the wide-band signal, a high-bandwidth digital data stream, individual channels, or other sources within the system.

After the analog signal preconditioner, the wide-band signal is sent to the analog correction block. The analog correction block may minimize and remove distortion from the wide-band signal. The analog correction block may also work in conjunction with the digital correction block following the wide-band ADC to provide a dither function. The analog correction block may also measure the wide-band signal and may provide a signal that may be used to control variable gain elements.

Following the analog correction block, the wide-band signal is sent to the wide-band ADC for conversion into a high-bandwidth digital data stream. This high-bandwidth digital data stream is sent to the digital correction block, which removes and minimizes distortion from the high-bandwidth digital data stream. The digital correction block may also measure the high-bandwidth digital data stream and provide a signal that may be used to control variable gain elements. Further, the high-bandwidth digital data stream is sent to the channel extractor.

In an alternative embodiment, the signal acquisition stage may contain multiple sets of processing blocks to achieve the signal acquisition function. For example, one embodiment may have a separate analog signal preconditioner for the amplitude modulated ("AM") band, and a separate analog signal preconditioner for the frequency modulated ("FM") band. In another embodiment, the analog correction function may be performed by separate AM and FM analog correction blocks. These blocks may provide separate gain controls signals for each band, and perform individual signal corrections particular to the band the block is handling. Yet other embodiments may have one ADC for the AM band and another for the FM band. It is noted that any combination of multiple sets of processing blocks may be used in alternative embodiments in order to achieve optimal signal acquisition characteristics.

In one embodiment of the present invention, the channel extractor comprises a channel extractor input interface, a processing block and a channel assembler. The channel extractor input interface accepts the high-bandwidth digital data stream from the signal acquisition stage and selects two or more time domain samples for input to the processing block. The time domain samples may then be multiplied by a window function to correct for distortion introduced by truncated mathematical functions and the presence of non-periodic inputs to the processing block. The processing block converts the two or more time domain samples into one or more frequency domain samples. The channel assembler demodulates and corrects the frequency domain samples, resulting in one or more individual channels. The channel assembler also extracts sub-bands containing data, e.g. metadata, from the stream of individual channels.

In an alternate embodiment, the channel extractor may comprise more than one processor block. Multiple processor blocks may be used to increase throughput. For example, the channel extractor input interface may select several successive sets of time domain data. Each set will be submitted to a separate, but functionally identical processor block for conversion to frequency domain samples. After the processor blocks perform the conversion, the channel assembler will reassemble the frequency domain samples from each successive processor block to form the correct sequence of individual channels.

The file management system may receive the individual channels directly, or the individual channels may first be compressed for more efficient storage. Compression functions may be performed by the parallel compressor. The parallel compressor may compress multiple channels simultaneously, or may use a time division multiplexing scheme where all samples from a given time frame from all the channels in the spectrum are processed through a single parallel compressor in seriatim until all the samples for that given time frame have been processed. Other embodiments may use a combination of parallel and time division multiplexing to achieve various system efficiencies.

The file management system may be coupled to various types of storage, both fixed and removable. Fixed storage may be comprised of a live pause buffer and a content archive, among other areas. The individual channels may be sent directly to the live pause buffer upon entry to the file manager. The live pause buffer is a circular time-shift buffer that stores the channel broadcasts as those broadcasts are received. The length of the circular time shift buffer is predetermined. For example, if the predetermined length of the live pause buffer is 2 hours, then broadcasts for the last two hours from the current time will be present in the live pause buffer for all channels in the spectrum. This feature allows the user to navigate the last two hours of programming for all channels by scrolling through the channels and time.

Further, the content archive may be used to store selected broadcasts for periods of time that would ordinarily be longer than the live pause buffer. Other content may also be stored in the content archive, such as content imported to the personal radio recorder from sources other than the wideband signal. While content and broadcasts may be stored in the content buffer indefinitely, an embodiment of the present invention provides for a mechanism to remove older content from storage in order to maximize fixed storage space for newer content.

The file management system can play back any individual channel at any time. For example, the individual channel may be played concurrent with the original broadcast, or may be a past broadcast identified by time and channel of original broadcast. The file management system may also flag particular broadcasts for playback. These broadcasts may be broadcasts that are preferred by the user such as scheduled traffic reports or news programs. The user may also create playlists of content and broadcasts that the user wishes to playback in a preferred order. In this manner, the file management system can quickly access preferred programs for playback by the listener at any randomly selected time in the future.

The file management system also has a user interface to aid in the selection and playback of broadcasts. For example, the user interface may allow the user to select broadcasts by navigating a two dimensional array of channels and times. A user may navigate through all the channels in the spectrum, and concurrently navigate from broadcasts occurring presently, to those occurring in the past, limited only by the amount of storage that may be installed in a particular embodiment.

Playback may be achieved in a number of manners. The file manager may send content or broadcasts selected for playback to one or more output stages. In one embodiment, the output stage may consist of a file decompressor, a digital post-processor, a digital switch, a digital to analog converter ("DAC"), an analog switch, at least one output amplifier, and at least one speaker. Content and broadcasts sent from the file manager may or may not be compressed. If the content is compressed, it may be expanded in the file decompressor. After the file decompressor, the signal is sent to the digital post-processor for noise reduction, pitch correction and other audio improvement techniques. Then, a digital switch allows the user to select either the decompressed data stream from the file decompressor, or an additional digital input. The data stream is then converted to an analog audio signal by the DAC, and sent to an analog switch. The analog switch allows the user to select among the analog audio signal from the DAC, and another analog source. Then the output stage amplifies the selected signal and sends it to one or more speakers to be transformed into sound.

In an alternative embodiment, the file manager may send the same content or broadcast to multiple output stages, or may send different content and broadcasts to a number of different output stages. In this manner, a single personal radio recorder may be used by different users to playback different content or broadcasts at the same time. For example, one user may listen to a broadcast on one channel while another user is listening to a different broadcast on a different channel. Alternatively, one listener may be listening to a broadcast that occurred in the past, or content from the content archive, while other users playback broadcasts that are presently occurring. Many different combinations are possible, only limited by the number and type of output stages in the system. Similarly, combinations of playback devices may be used, such as a speaker system for one output stage, and headphones for another.

The present invention beneficially provides for concurrent acquisition, storage and playback of an entire spectrum of individual channels from a wide-band signal. Another advantage of the present invention includes providing random access to radio broadcasts by channel and time, as well as other methods. A further advantage of the present invention allows simultaneous playback of multiple channels of broadcasts or content through multiple output stages. These and other features, aspects, and advantages of the present invention will become better understood with regard to the following description, appended claims, and accompanying drawings.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes.

BRIEF DESCRIPTION OF THE DRAWINGS

The Figures depict embodiments of objects and features of the present invention and are for illustration purposes only. The Figures are more fully disclosed in the following detailed description, reference being made to the accompanying drawings, in which:

FIG. 7B is a table of data and content used by the file manager identifying the origin of the content and data.

DETAILED DESCRIPTION OF THE PREFERRED EMBODIMENTS

Reference will now be made in detail to several embodiments of the present invention, examples of which are illustrated in the accompanying drawings. It is noted that wherever practicable similar or like reference numbers may be used in the figures and may indicate similar or like functionality.

Generally, the present invention relates to a personal radio recorder system that acquires a wide-band signal containing individual channels and concurrently tunes and demodulates the individual channels. After demodulation, the set of individual channels may be compressed and stored. Additionally, individual channels can be selected for real time, or time-shifted (e.g. delayed) playback. Further, the individual channels and any associated channel information may be manipulated to allow more efficient access to user requested channel broadcasts.

System Overview

Figure 1:
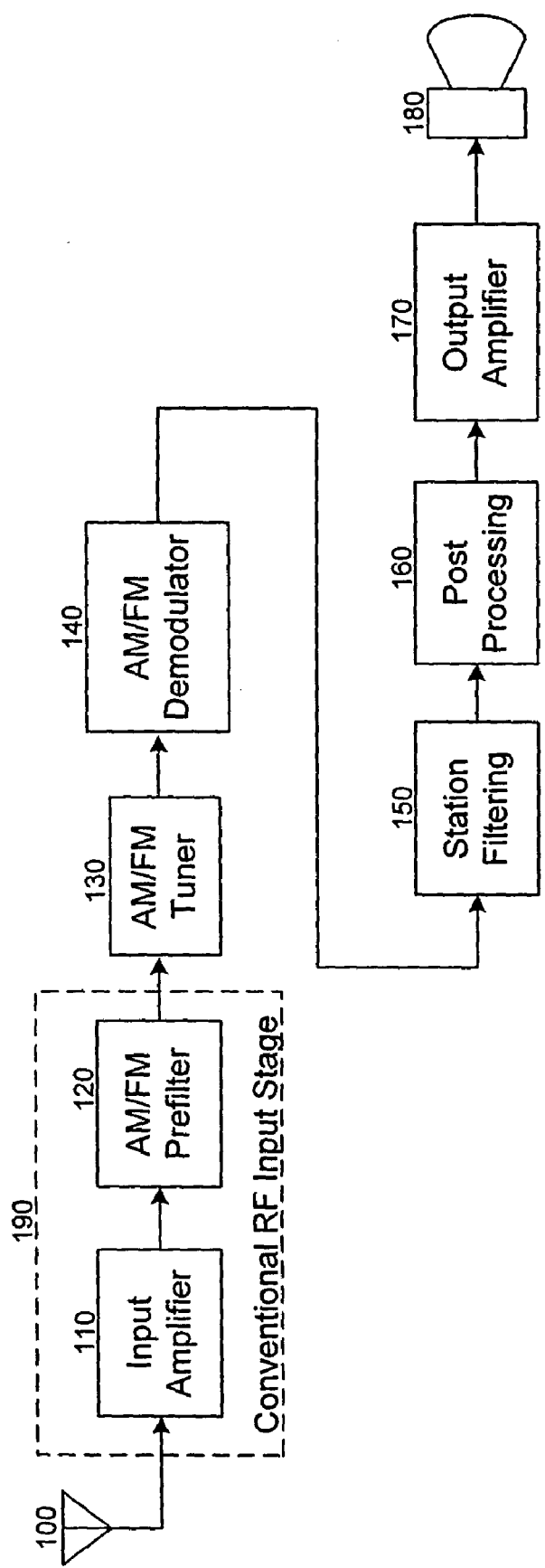
FIG. 1 is a block diagram of a prior art audio system for receiving a wide-band signal and demodulating a single audio channel.
Figure 2:
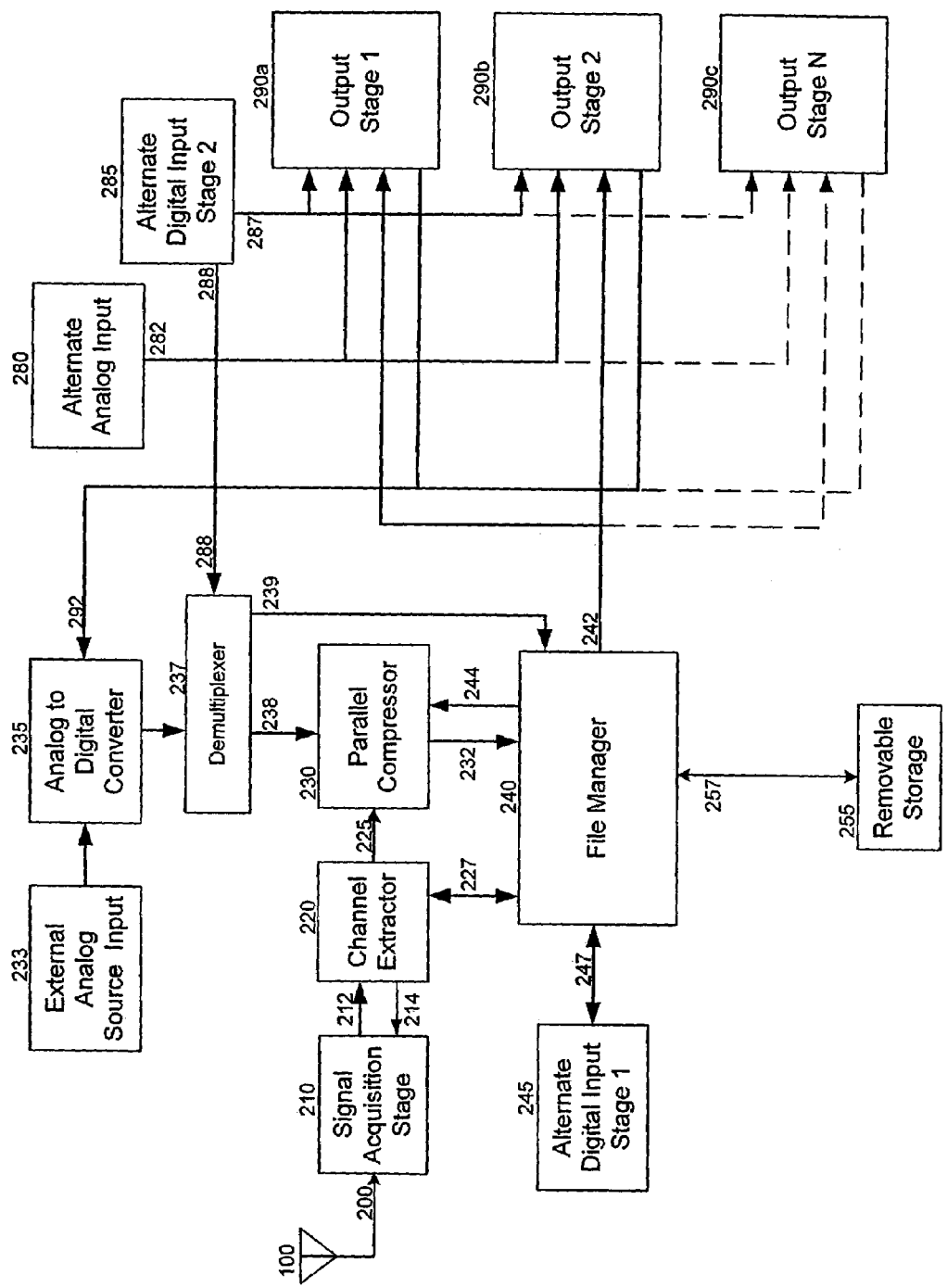
FIG. 2 is a block diagram of one embodiment of the present invention for reception, concurrent demodulation and storage of a wide-band signal comprised of a plurality of individual channels.

FIG. 2 illustrates a block diagram of the multi-channel capture and playback system of the present invention. The capture and playback system includes a signal acquisition stage 210, a channel extractor 220, an external analog source input 233, and analog to digital converter ("ADC") 235, a demultiplexer 237, a parallel compressor 230, a file manager 240, an alternate digital input stage 1 245, removable storage 255, alternate analog input stage 280, alternate digital input stage 2 285, and one or more output stages. For example, the output stages may be output stage 1 290a, output stage 2 290b, and output stage N 290c. Typically, the signal acquisition stage 210 is coupled to receive a wide-band signal through, for example, an antenna 100. The signal acquisition stage 210 also couples with the channel extractor 220. The channel extractor 220 is coupled to the parallel compressor 230. The channel extractor 220 is also coupled to the file manager 240 via connection 227.

The parallel compressor 230 is coupled to a demultiplexer 237 via connection 238. The demultiplexer 237 is also coupled to an ADC 235 that receives input signals from the external analog source input 233. Further, the demultiplexer is coupled to alternate digital input stage 2 285 through connection 288, and the file manager 240 via connection 239. The parallel compressor 230 is coupled to the file manager 240.

The file manager 240 is also coupled to the removable storage 255, the alternate digital input 1 245, and one or more output stages. Again, for example, the output stages may be output stage 1 290a, output stage 2 290b, and output stage N 290c. The output stages are also coupled to receive input from the alternate analog input 280 and the alternate digital input stage 2 285.

Functional Overview

In one embodiment of the multi-channel capture and playback system of the present invention the signal acquisition stage 210 receives a wide-band signal from an antenna 100 via connection 200. The signal acquisition stage 210 converts the wide-band signal into a high-bandwidth digital data stream. The signal acquisition stage 210 may also amplify the wide-band signal in response to a gain control signal 214 from the channel extractor 220. After conversion, the high-bandwidth digital data stream is sent to the channel extractor 220 via connection 212. The channel extractor 220 demodulates the high-bandwidth digital data stream into a stream of one or more demodulated individual channel samples. The channel extractor 220 also extracts data, e.g. metadata, from the demodulated individual channels and sends a stream of aggregate metadata to the file manager 240 via connection 227.

The channel extractor 220 may also measure the magnitude of the individual channel samples and send a gain control signal 214 to the signal acquisition stage 210. The stream of individual channel samples output from the channel assembler comprises a demodulated aggregate of individual channels. The demodulated aggregate of individual channels is then sent to the parallel compressor 230. In response to a compression signal 244 from the file manager 240, the parallel compressor 230 may compress one or more individual channels for more optimal storage. The compression signal 244 may signal the parallel compressor 230 not to compress the signal at all. In this case, the demodulated aggregate of individual channels will pass through the parallel compressor 230 unchanged. The compression signal 244 from the file manager 240 may also specify certain compression parameters such as compression ratio or compression technique.

In one embodiment of the present invention, the parallel compressor uses adaptive differential pulse code modulation ("ADPCM") for compressing the individual channels. The parallel compressor may contain a compressor for each individual channel contained in the demodulated aggregate of individual channels thereby processing the channels in parallel. In another embodiment, the parallel compressor may use time division multiplexing to processes the channel samples for the entire spectrum through a single compressor in seriatim. In yet another embodiment, the parallel compressor may use a combination of time division multiplexing and parallel processing to achieve system efficiencies. Further, many different compression techniques beyond ADPCM are well known and may be employed to achieve various compression ratios and efficiencies.

The parallel compressor 230 also may accept a digital signal from the demultiplexer 237. The demultiplexer 237 receives a stream of alternate input programs from the ADC 235. The demultiplexer 237 may also receive a program from the alternate digital input stage 2 285. Further, the demultiplexer 237 may extract data, e.g. metadata from the programs and send a stream of aggregate metadata to the file manager 240 via connection 239.

The ADC converts analog signals from the external analog source input 233, or from the output stages, including output stage 1 290a, output stage 2 290b, and output stage 2 290c. Because the parallel compressor accepts inputs from these other sources, additional content can be input to the file manager for storage and manipulation. For example, output stage 1 290a is coupled to the alternate analog input 280. This alternate analog input 280 may be connected to an audio tape player. The content from the audio tape player may be routed to the parallel compressor 230 for compression and then sent to the file manager 240. Similarly, external analog sources, such as a CD player or MP3 player that connects via a headphone jack to the external analog source input 233 can also be input to the file manager 240 for storage and manipulation (e.g., filtering, categorizing, storage, and playback).

Figure 9:
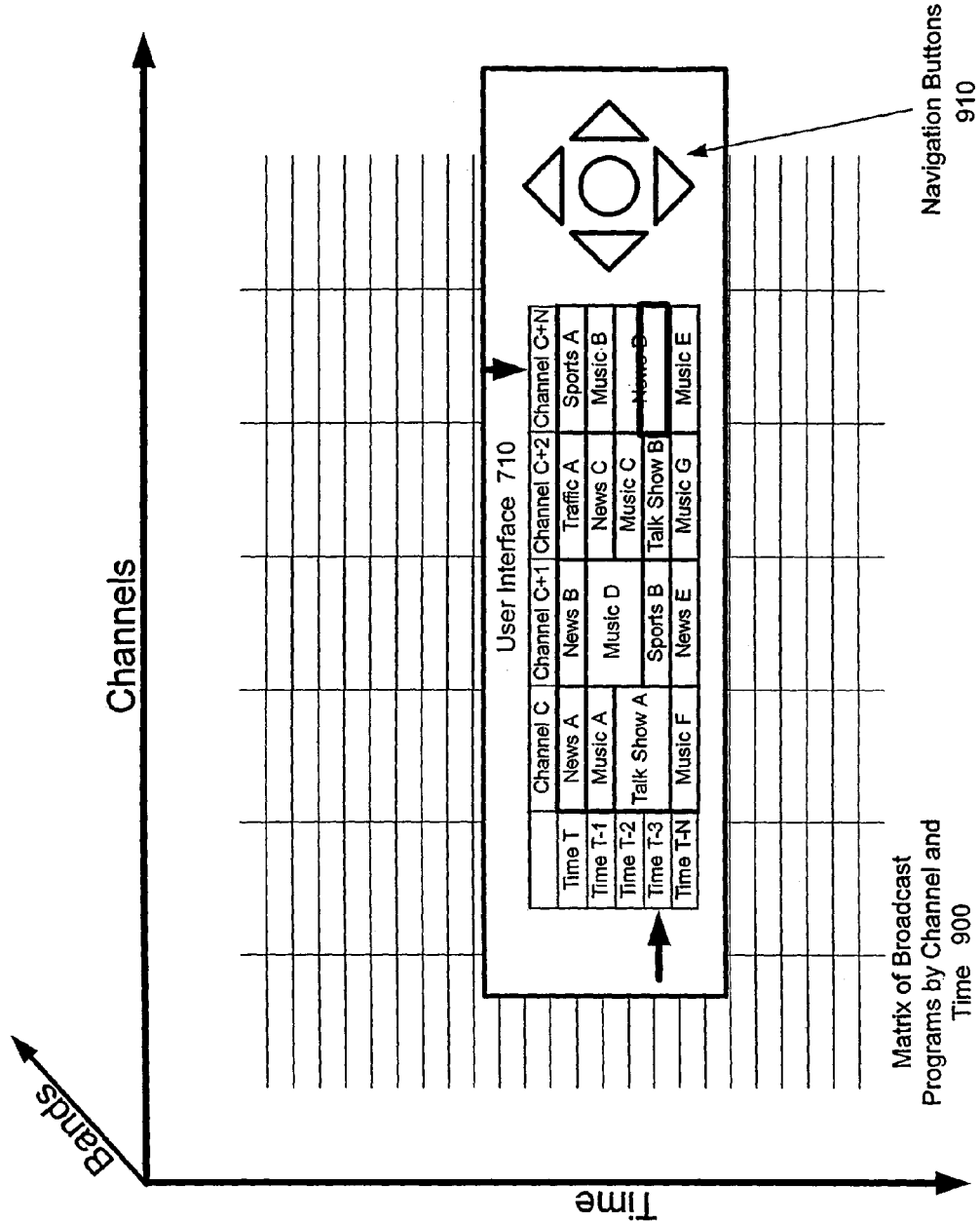
FIG. 9 is a pictorial description of one embodiment of the user interface superimposed on a two dimensional array of broadcasts arranged by channel and time.

After compression, a stream of compressed audio programs is sent to the file manager 240. The file manager 240 identifies each program by channel and the time the program was received. The file manager 240 may organize and store the programs. The file manager 240 may also include a user interface, further illustrated in FIG. 9, for presenting information about the programs to the user and receiving inputs from the user.

The file manager 240 may also accept one or more digital communications channels from another source through the alternate digital input stage 1 245. This input may also be a multi-channel digital bus. The alternate digital input stage 1 245 may be used to input other types of digitally formatted content such as satellite radio and television. The alternate digital input stage 1 245 may also be used to input location information, such as that provided by the Global Positioning System ("GPS"). Further, the alternate digital input stage 245 may be used to connect to a gateway device such as a personal computer, wireless digital phone, or a wireless network device. Similarly, the removable storage 255 may be used to transfer content and other information to and from the file manager 240. The file manager 240 may also store channel broadcasts to the removable storage 255, or copy stored broadcasts and content to the removable storage 255.

An alternate embodiment may have more than one alternate digital input stage 245 or removable storage 255. For example, a two alternate digital input stages 245 may be coupled to a single file manager 240: One alternate digital input stage 245 may be used to input other types of digitally formatted content, e.g. music, and data, e.g. metadata, and another digital input stage 245 may be used to connect with a gateway device. Similarly, the file manager may be coupled to one or more removable storage devices 255. The removable storage 245 may be any type of removable storage device, including but not limited to Compact Flash, Smart Media, SD memory, Memory Stick, MiniDisk, removable magnetic tape or hard drives, removable flash devices, or optical storage such as Compact Disks or DVDs. More than one of these may be coupled to the file manager 240 as well as combinations of any of the aforementioned devices.

Additionally, the file manager 240 may playback individual or multiple channels of currently occurring broadcasts, or stored content or broadcasts, or a combination of current broadcasts and stored broadcasts or content. For example, consider the situation where the file manager 240 is currently receiving broadcasts A, B and C, and has previously stored content and broadcasts D, E and F. The file manager 240 may send broadcast A to output stage 1 290*a*, broadcast B to output stage 2 290*b* and broadcast C to output stage N 290*c*. Alternatively, the file manager may send stored content D to output stage 1 290*a*, stored broadcast E to output stage 2 290*b*, and stored broadcast F to output stage N 290*c*. Or, the file manager may send any combination of currently occurring broadcasts and stored content to the output stages. For example, the file manager may send presently occurring broadcasts to output stage 1 290*a*, and output stage 2 290*b*, and a previously stored broadcast to output stage N 290*c*. In this example, three output stages have been illustrated. However, more or fewer output stages may be used in alternate embodiments of the present invention.

Signal Acquisition Stage Architecture

Figure 3:
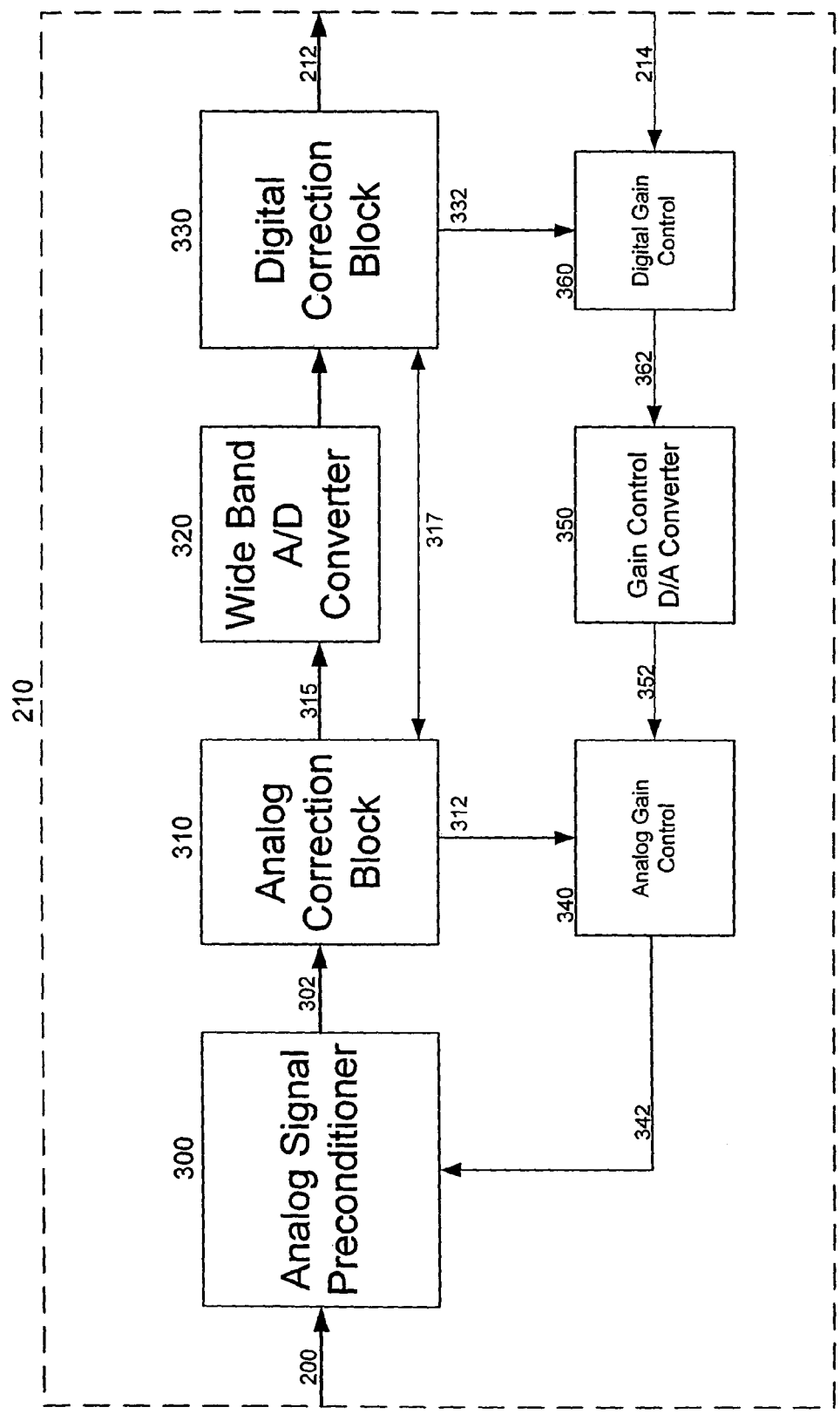
FIG. 3 is a block diagram of one embodiment of the signal acquisition stage of the present invention.

Turning now to FIG. 3, one embodiment of the signal acquisition stage 210 of the multi-channel capture and playback systems of the present invention is illustrated. This embodiment includes an analog signal preconditioner 300, an analog correction block 310, a wide-band ADC 320, a digital correction block 330, an analog gain control 340, a gain control digital to analog converter ("DAC") 350 and a digital gain control 360. The analog preconditioner 300 receives a wide-band signal via connection 200. Additionally, analog signal preconditioner 300 receives an analog gain control signal 342. The analog signal preconditioner 300 is further coupled 302 to the analog correction block 310.

The analog correction block 310 is coupled 315 to a wide-band ADC 320. The analog correction block 310 is also coupled to the analog gain control via an analog signal measurement connection 312. Further, the analog correction block couples to the digital correction block via dither control signal 317.

The wide-band ADC 320 is coupled to the digital correction block 330. The digital correction block 330 couples to the digital gain control 360 via a digital gain control and measurement signal 332. The digital gain control 360 also receives the digital gain control signal 214. Further, the digital gain control 360 connects via connection 362 to the gain control DAC 350, which in turn connects via connection 352 to the analog gain control 340.

Signal Acquisition Block Functional Description

As an example of the operation of the signal acquisition block 210, a wide-band signal enters the analog signal preconditioner 300 from connection 200. The analog signal preconditioner 300 may comprise filtering, variable gain, fixed gain, or any one or a combination of these basic elements. In one embodiment, the personal radio recorder in accordance with the present invention may be configured to receive the FM band in the United States. In this configuration, the wide band signal may require an initial amplification to increase the magnitude of the signal by a fixed amount. The analog signal preconditioner 300 may also filter out frequencies above and below the FM band leaving mostly frequencies from the band of interest, in this case the FM band. Then the analog signal preconditioner 300 may send the wide-band signal to the analog correction block 310.

Additionally, the analog signal preconditioner 300 may be used to increase the wide-band signal to a magnitude that is close to the maximum input range of the wide-band ADC 320. In some areas, and especially in mobile applications where the personal radio recorder may be constantly moving through areas of stronger and weaker wide-band signals, this feature is useful for compensating changes in the magnitude of the wide-band signal. In one embodiment, two different gain models may exist: One model for stationary gain control, and a second model for gain control while the personal radio recorder is moving, e.g. in a car or other automotive vehicle. In the later second model, the gain control may be designed using consideration such as the expected velocity, multi-path effects and other signal phenomena that occur due to the motion of the personal radio recorder. Based on the appropriate model, the analog correction block 310 may measure the magnitude of the wide-band signal and report this measurement to the analog gain control 340. The analog gain control 340 may then make some calculations and send the resulting analog gain control signal 342 to the analog signal preconditioner 300 where a variable gain element can amplify the signal in response to the analog gain control signal 342.

Figure 6:
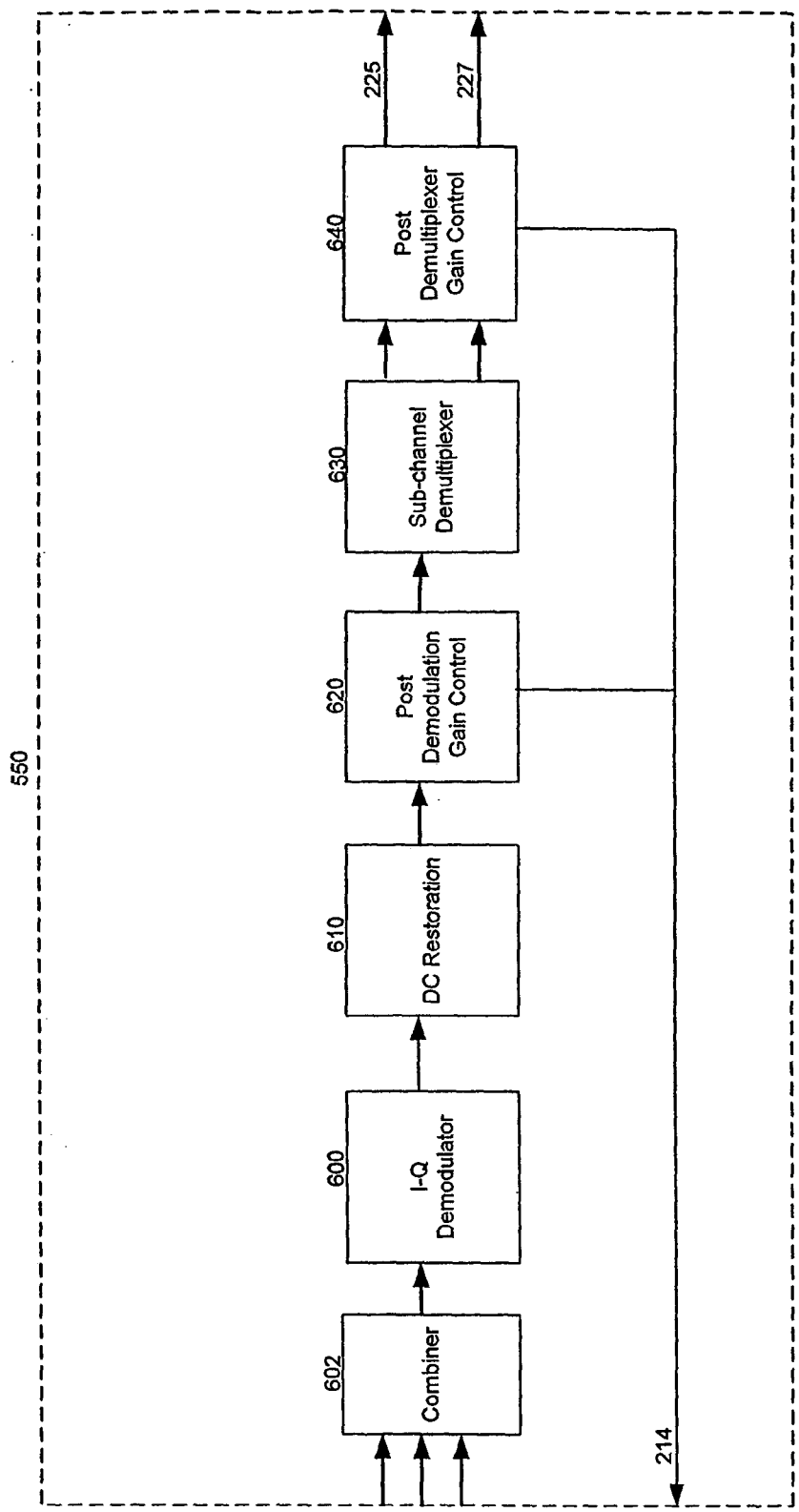
FIG. 6 is a block diagram of one embodiment of the channel assembler of the present invention.

Similarly, the gain adjustments described above may also be implemented using other gain control blocks such as the digital correction block 330, the post demodulation gain control 630 or the post demultiplexer gain control 640 of FIG. 6. Further, a combination of any of the adjustable gain control block may be used to achieve appropriate correction for changes in signal strength in fixed or moving applications.

The analog correction block 310 may also be used to correct for distortions to the wide-band signal through various well-known techniques. In another embodiment, the analog correction block 310 may be used to add dither to the input signal to the wide-band ADC 320. Various dithering techniques for increasing the performance of ADC systems are well-known and may be used in the analog correction block 310 and the digital correction block 330 of the present invention.

The wide-band signal is then sent from the analog correction block 310 via connection 315 to the wide-band ADC 320. In this embodiment, the wide-band ADC 320 converts the wide-band signal into a high-bandwidth digital data stream. The wide-band ADC may be a conventional, commercially available wide-band analog to digital converter, for example, AD6640 made by Analog Devices, Inc. (Norwood, Mass.). Alternatively, the wide-band ADC may be custom designed or may be comprised of an existing semiconductor core and implemented in an application specific integrated circuit ("ASIC").

The wide-band ADC 320 can be sampled at a number of different rates to achieve demodulation. Two examples will be familiar to those skilled in the art: Nyquist rate sampling, and sub-Nyquist sampling. The wide-band ADC 320 clock rate can be determined as follows: First, the number of individual channels in the band is determined. Second, the number of individual channels is multiplied by the bandwidth of each channel. Third, to satisfy the Nyquist theorem well known to those skilled in the art, the number is multiplied by at least a factor of two. The resultant number is the clock frequency for the wide-band ADC 320. For example, if the system is to produce 128 channels, each with a bandwidth of 10 kHz, then a minimum clock frequency of 2.56 MHz should be input to the wide-band ADC 320 (2×128 channels×10,000 Hz). This would cause the wide-band ADC 320 to output a high-bandwidth digital data stream comprising 2,560,000 digital data samples per second.

Those skilled in the art will recognize that the wide band ADC 320 may also be configured to accomplish sub-Nyquist sampling. To achieve this, the analog signal preconditioner 300 would include an analog input filter 420 that would be chosen such that only the desired frequency band or less would be input to the wide-band ADC 320. For example, the analog input filter 420 may be configured such that only frequencies 500 kHz to 1.780 MHz would be input to the wide-band ADC 320.

Moreover, the signal acquisition stage 210 may also be designed to down-convert the incoming wide-band signal to an intermediate frequency. In this manner, two steps would provide the frequency conversion of the wide-band signal into the high-bandwidth digital data stream: a mixer, and the wide-band ADC 320. The mixer would down-convert the wide-band signal either into a base band to be sampled by the wide-band ADC 320, or into an intermediate frequency to be further down-converted by the wide-band ADC 320.

Other well-known methods of analog to digital conversion of wide-band signals may also be used. The wide-band ADC 320 and the analog signal preconditioner 300 could be configured to sample at a rate higher than the desired frequency band, where the unwanted bands could be later filtered out or otherwise removed from the signal stream. For example, for the AM band the wide-band ADC 320 could be configured to convert frequencies from DC to 2 MHz, where the frequencies from DC to 500 kHz would be discarded, ignored or otherwise filtered out later. Alternatively, a windowing multiplier could be employed to effectively down-shift the first channel at 550 kHz to a lower frequency band.

After the wide-band ADC 320 converts the wide-band signal to a high-bandwidth digital data stream, the high-bandwidth digital data stream is sent to the digital correction block 330. The digital correction block may be configured to correct distortion present in the high-bandwidth digital data stream. In one embodiment, the digital correction block 330 includes a digital look-up table that accepts an individual digital value from the high-bandwidth digital data stream and substitutes a value from the digital look-up table. This value from the digital look-up table may have more effective bits than the wide-band ADC 320. For example, the wide-band ADC 320 may output digital samples sixteen bits wide, and the digital look-up table may output digital samples that have eighteen or twenty bits. The digital correction block 330 may also be configured to correct other errors, for example, the effects of digitization, dither, and de-emphasis.

Additionally, the digital correction block 330 may provide magnitude measurements to the automatic gain control system and may perform local automatic gain control. In a basic embodiment, the digital correction block 330 may measure the magnitude of the high-bandwidth digital data stream and report this measurement to the digital gain control 360 via connection 332. The digital gain control 360 may perform calculations on the measurement and send a new value to the gain control DAC 350. The gain control DAC 350 converts the value to an analog signal and sends it to the analog gain control 340 for further processing. The analog gain control 340 will then provide an analog gain control signal 342 to the analog signal preconditioner 300 for adjustment of the variable gain elements.

In an alternative embodiment, the digital correction block 330 may be configured to maximize the magnitude of the high-bandwidth digital data stream to make more effective use of elements in other parts of the system. The digital correction block 330 would measure the magnitude or the high-bandwidth digital data stream and select a gain corresponding to a target magnitude for the high-bandwidth digital data stream. Then the digital correction block 330 would multiply the high-bandwidth digital data stream by the selected gain. The digital correction block 330 may report the original magnitude of the high-bandwidth digital data stream to the digital gain control 360 for further gain control in other stages. After correction and amplification, the digital correction block 330 sends the high-bandwidth digital data stream to the channel extractor 220 via connection 212.

The digital gain control 360 may also receive gain control signals from the channel extractor 220 via connection 214. The digital gain control 360 may use these signals in conjunction with the measurements from the digital correction block 330 or may exclusively use one or the other. Those of skill in the art will recognize that multiple combinations of the gain control elements presented in this embodiment of the present invention may be used to obtain beneficial results.

In an alternate embodiment, the digital gain control 360 may direct the digital correction block 330 to provide the measurement signal or a derivative of the measurement signal to the parallel compressor 230 in the form of a feed-forward gain control signal. This signal may be communicated through connection 212, or through some parallel signal path. Similarly, the digital gain control 360 received gain control measurement signals from other elements in the channel extractor 220 via the gain control signal 214 to be discussed later. The digital gain control may provide these signals to the parallel compressor 230 in a like manner as the signal from the digital correction block 330.

Alternate embodiments of the signal acquisition block 210 may contain separate signal chains for different frequency bands of interest. For example, in one embodiment, the signal acquisition block 210 may contain one analog signal precondition 300, analog correction block 310, and automatic gain control 340 for each band of interest. Where the bands of interest are the AM and FM bands, the signal acquisition block 210 may contain an AM analog signal preconditioner, FM analog signal preconditioner, an AM analog correction block, an FM analog correction block, an AM analog gain control block, and an FM analog gain control block. Similarly, other embodiments may have separate wide-band ADCs 320 for each band of interest, for example, one for AM, another for FM, and another for short wave. In yet another embodiment, the entire signal chain depicted in FIG. 3 may be duplicated for each band of interest. Those of skill in the art will recognize the various features and benefits from using separate signal chains for different frequency bands.

Analog Signal Preconditioner

Figure 4:
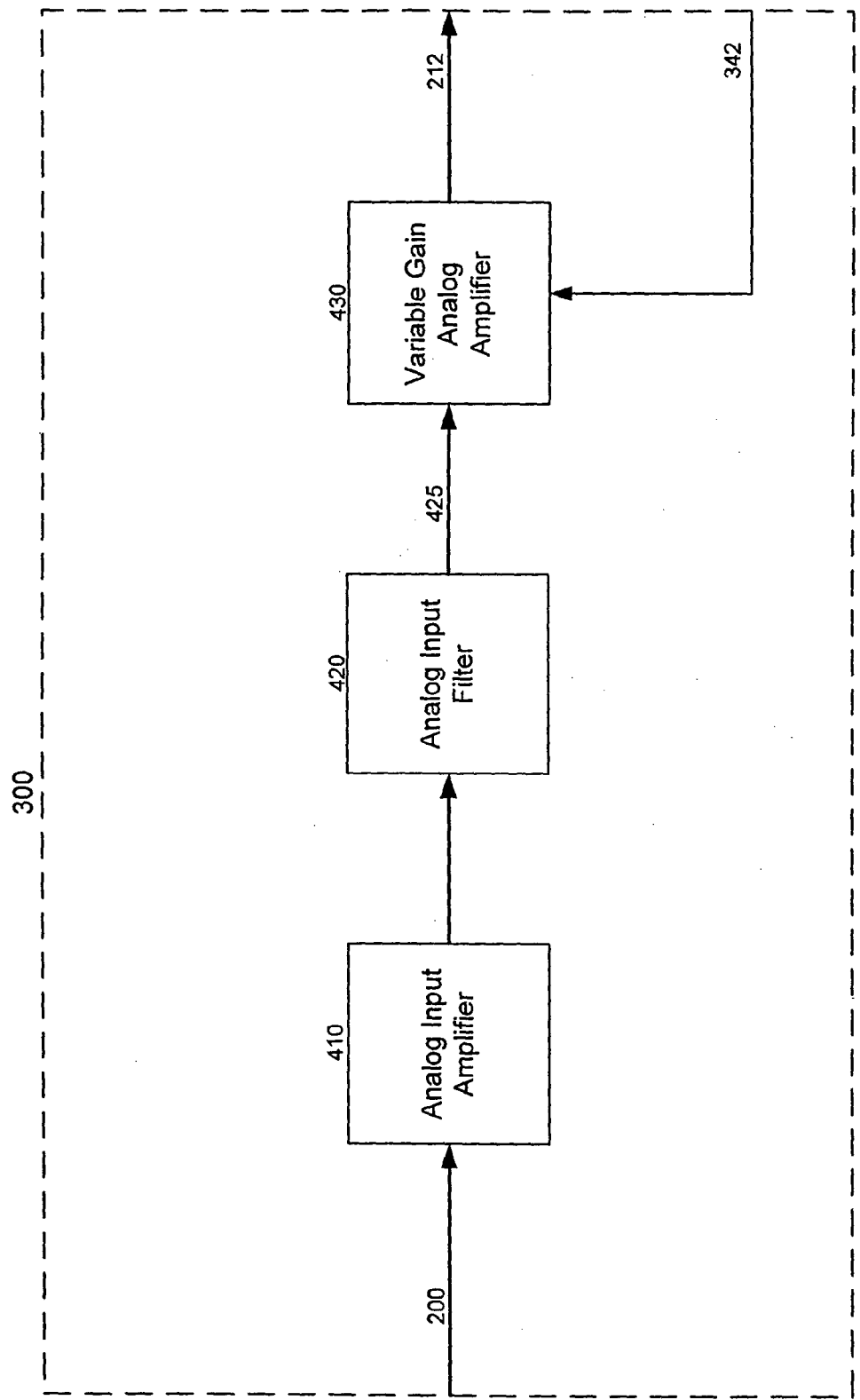
FIG. 4 is a block diagram of one embodiment of the analog signal preconditioner of the signal acquisition stage.

In one embodiment of the analog signal preconditioner 300 depicted in FIG. 4, the analog signal preconditioner 300 is comprised of an analog input amplifier 410, an analog input filter 420, and a variable gain analog amplifier 430. The analog input amplifier 400 receives the wide-band signal via connection 200 and is coupled to the analog input filter 420. The analog input filter 420 is coupled 425 to the variable gain analog amplifier 430. The variable gain analog amplifier 430 receives an analog gain control signal 214 and outputs an amplified and filtered wide-band signal via connection 212.

The analog input amplifier 410 amplifies the wide-band signal by a predetermined fixed value. An amplified wide-band signal is sent to the analog input filter 420. The analog input filter 420 filters out unwanted frequencies. For example, in the US, the FM signal band ends at 108 MHz. The analog input filter 420 may be configured to filter out frequencies above 108 MHz. The analog input filter 420 then sends the amplified and filtered wide-band signal to the variable gain analog amplifier 430. The variable gain analog amplifier 430 selects a gain in response to the analog gain control signal 342. The variable gain analog amplifier 430 multiplies the wide band signal sent from the analog input filter 420 by the selected gain.

Channel Extractor Architecture

Figure 5:
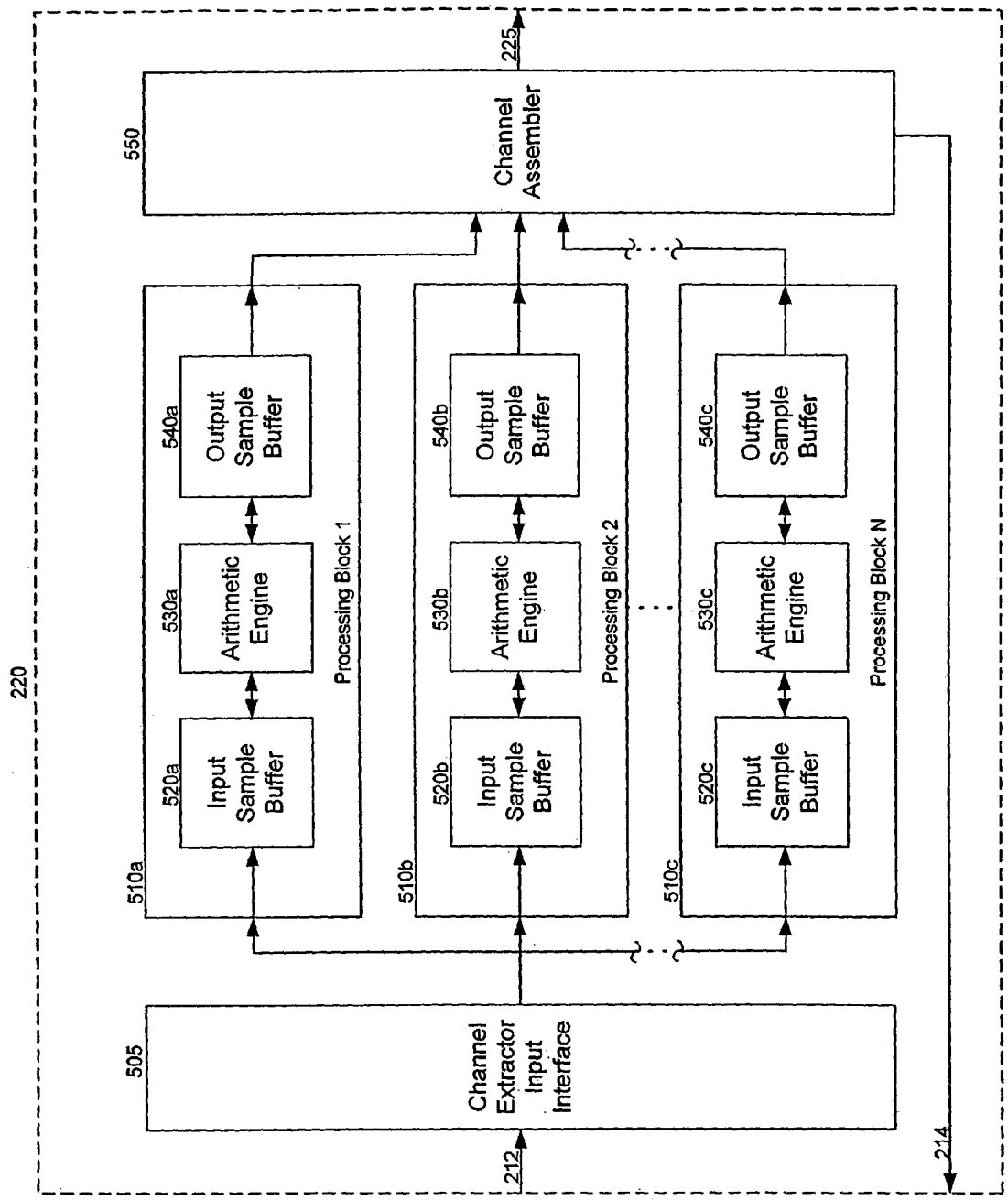
FIG. 5 is a block diagram of one embodiment of the channel extractor of the present invention that converts the high-bandwidth digital data stream into a plurality of individual channels.

FIG. 5 illustrates a block diagram of a preferred embodiment of the channel extractor 220. One function of the channel extractor 220 is to demodulate the high-bandwidth digital data stream into one or more individual channels. In one embodiment, the channel extractor 220 contains three main functional blocks: a channel extractor input interface 505, at least one processing block 1 510a, and a channel assembler 550. The processing block may further include an input sample buffer 520a, an arithmetic engine 530a, and an output sample buffer 540a. The output 212 of the signal acquisition stage 210 is coupled to the channel extractor input interface 505. The channel extractor input interface is coupled to at least one processing block 1 510a. The input of the processing block is coupled to the input sample buffer 520a. The input sample buffer is coupled to the arithmetic engine 530a. The arithmetic engine 530a is coupled to the output sample buffer 540a. The output sample buffer 540a forms the output of the processing block 1 510a. The output of the processing block 1 510a is coupled to the channel assembler 550. The channel assembler 550 provides the output 225 of the channel extractor 220.

Channel Extractor Functional Description

In operation, the channel extractor input interface 505 may be used to select two or more time domain samples from the high-bandwidth digital data stream and perform other preparations as further described below. The two or more time domain samples may then be converted to one or more frequency domain samples by processing block 1 510a. The one or more frequency domain samples are demodulated and assembled into a stream of one or more individual channels by a channel assembler 550. A more detailed discussion of each block follows.

At the input connection 212, the high-bandwidth digital data stream comprises a digital stream of time domain samples. For example, the stream may be comprised of a stream of samples, t, each having a number of bits dictated by the wide-band A/D converter 320 and the digital correction block 330 such that they form a stream of time domain samples:

$t_0, t_1, t_2, t_3, t_4, t_5, t_6, t_7, t_8, t_9, t_{10}, t_{11}, t_{12}, t_{13}, t_{14}, t_{15}, t_{16}, t_{17} \ldots t_n$.

The channel extractor input interface 505 dissects the digital stream of time domain samples into sets of two or more time domain samples, such as $t_0, t_1, t_2, t_3, t_4, t_5, t_6, t_7, t_8$, for input to the Processing Block 1 510a. Each time sample, $t_n$, is paired with an imaginary component $i_n$. After pairing the real samples with the imaginary samples, each sample may be multiplied by a window coefficient, $w_n$. The window function may or may not be used depending upon the particular embodiment. In the preferred embodiment, the window function may be any one of the well-known types used in the field of art, such as Hamming, von Hann, Blackman, Fejer, or Kaiser, as well as others. After the samples and their imaginary counterparts have been multiplied by the window function coefficient, the set of two or more time domain samples and two or more imaginary counterparts are sent to the processing block 610a.

The size of the set of two or more time domain samples varies depending upon bandwidth and resolution constraints. For example, to increase the throughput of the systems, multiple processing blocks may be used in a parallel, pipelined-style architecture. Referring to FIG. 5, an example of N processing blocks is shown, where N may be any integer value. For convenience, reference is made to an example of system where N=4. In this example, the channel extractor input interface 505 will select a first set of time domain samples from the stream of time domain samples and after adding an imaginary component and multiplying by the window function, the first set of samples is sent to processing block 1 610a. For instance, if the stream of time domain samples is represented by samples $t_0, t_1, t_2, t_3, t_4, t_5, t_6, t_7, t_8, t_9, t_{10}, t_{11}, t_{12}, t_{13}, t_{14}$, and $t_{15}$ then the first set of samples may be represented by $t_0, t_1, t_2$ and $t_3$. Immediately following the sending of the first set of samples, the channel extractor input interface 505 sends a second set of samples, $t_4, t_5, t_6$, and $t_7$ to a processing block 2 510b. Then, the channel extractor input interface 505 sends a third set of samples, $t_8, t_9, t_{10}$, and $t_{11}$ to processing block 3 510c. Finally, the channel extractor input interface 505 sends a third set of samples, $t_{12}, t_{13}, t_{14}$, and $t_{15}$ to a fourth processing block. In this manner, the stream of time domain samples can be processed through the processing blocks in a fraction of the time required to process the stream of time domain samples through only the processing block 1 510a. It is noted that more or fewer processing blocks may be used to gain the required throughput while minimizing other considerations such as cost and space.

Similarly, to increase the performance, e.g. selectivity, noise reduction, or resolution of the channel extractor 220, the stream of time domain samples may be processed by the processing blocks in a manner in which each sample is processed by more than one processing block and used by the channel assembler 650 for interpolation. For example, consider the time domain samples represented by the series $t_0, t_1, t_2, t_3, t_4, t_5, t_6$, and $t_7$. The channel extractor input interface 505 may send samples $t_0, t_1, t_2$, and $t_3$ to the processing block 1 510a and samples $t_4, t_5, t_6$, and $t_7$ to processing block 3 510c. Processing block 2 510b would receive samples $t_2, t_3, t_4$, and $t_5$. After the first processing block, in this example processing block 1 510a, completes processing samples $t_0, t_1, t_2$, and $t_3$, the channel extractor input interface 505 will advance the high-bandwidth digital data stream to select as the next group of time domain samples $t_6, t_7, t_8, t_9, t_{10}, t_{11}, t_{12}$, and $t_{13}$. Processing will continue as previously described. In this manner, all samples after $t_1$ will be processed by two different processing blocks. This example results in an overlap value of two.

The following discussion has assumed a particular size for the two or more time domain samples and an overlap factor of two. It is noted that the size of the two or more time domain samples will vary according to the bandwidth of the frequency band of interest and the individual channels. Similarly, overlap factors may be as low as one or as high as three or higher depending on resolution requirements.

After the channel extractor input interface 505 processes the high-bandwidth digital data stream, the time domain samples are sent to the processing block 1 510a. The processing block 1 510a converts the time domain samples into one or more frequency domain samples. In one embodiment, the conversion is performed through the use of a Radix-2 implementation of a Fast Fourier Transform. The time domain samples are placed in an input sample buffer 520a. A modulo counter addresses and selects two time domain samples in the input sample buffer 520a or stored intermediate results, and a coefficient from a coefficient table for processing by an arithmetic engine 530a. The arithmetic engine 530a performs butterfly mathematical operations required by the Radix-2 implementation and the final results are placed in the output sample buffer 540a. The contents of the output sample buffer 540a are clocked out of the output sample buffer 540a by the modulo counter to become two or more frequency domain samples.

The processing block 1 510a can be implemented in a number of ways. One function of the processing block 1 510a is to convert the time domain samples into one or more frequency domain samples. Those skilled in the art will recognize that many functions may be used to implement the processing block 1 510a including Discrete Fourier Transform and Fast Fourier Transform ("FFT") functions. These may include implementation such as Radix-2, Radix-4, mixed radix, optimization for real inputs and other non-FFT techniques including digital filters, filter banks, combination with numerically controlled complex oscillators, or other digital signal processing techniques that are conventional.

The frequency domain samples comprise a set of frequency bins, i.e., brackets of bandwidth of the desired frequency band. For example, if the desired frequency band contains 128 channels, each with a bandwidth of 10 kHz, the bandwidth of the desired frequency band is 1.28 MHz. To satisfy sampling theorem requirements, the sampling frequency of the wide-band A/D converter 320 is doubled, resulting in a high-bandwidth digital data stream comprising individual digital time domain samples at 2.56 MHz. In this example, each input sample buffer 520a would be loaded with 256 samples from the time domain samples. For this example where the processing block 1 510a has been implemented using a type of FFT known as Decimation in Frequency, the resulting frequency domain samples will be comprised of a zero-frequency (e.g. DC) sample, 127 frequency domain samples, and 128 complex conjugates of the frequency domain samples. At any point after the arithmetic engine 530a performs the conversion, the complex conjugates may be discarded. The frequency domain samples now resident in the output sample buffer 540a are sent to the channel assembler 550.

At this point, the frequency domain samples each comprise a complex number containing two values: An in-phase component ("I"); and quadrature component, ("Q"). For example, for a band with 8 channels, the frequency domain samples may be represented as follows: $f_0$, $f_1$, $f_2$, $f_3$, $f_4$, $f_5$, $f_6$, $f_7$. Sample $f_2$, for instance, comprises the I-Q components for $f_2$: $I_{f2}$ and $Q_{f2}$. It is noted that the I and Q components of the frequency domain samples may be demodulated to obtain a magnitude for each frequency sample. This magnitude of each frequency sample is the instantaneous individual channel magnitude. By combining a stream of sequential channel magnitudes, the audio signal from each individual channel may be constructed. It is noted that demodulation occurs in the channel assembler 550, which is further described below.

Channel Assembler Architecture

Demodulation of different types of I-Q modulation is well known in the art. For example, FIG. 6 illustrates an embodiment of the channel assembler 550 for demodulating the stream of frequency domain samples. The channel assembler 550 in this embodiment includes a combiner 602, an I-Q demodulator 600, a DC restoration block 610, a post demodulation gain control 620, a sub-channel demultiplexer 630 and a post demultiplexer gain control 640. The outputs from the processing blocks are coupled to the combiner 602. The combiner 602 is coupled to the I-Q demodulator 600. The I-Q demodulator 600 is coupled to the DC restoration block 610. The DC restoration block 610 is coupled to the post demodulation gain control 620. The post demodulation gain control 620 is coupled to the digital gain control signal 214 and the sub-channel demultiplexer 630. The sub-channel demultiplexer 630 is coupled to the post demultiplexer gain control 640 via two connections. One connection outputs a demodulated aggregate of individual channels and the other outputs a stream of aggregate metadata. The post demultiplexer gain control 640 is coupled to the digital gain control signal 214, the demodulated aggregate of individual channels output 225 of the channel assembler 550 and the stream of aggregate metadata output 227 of the channel assembler 550.

Channel Assembler Functional Description

In operation, the frequency domain samples are received by the combiner 602. The combiner assembles the frequency domain samples from N processing blocks into a stream of frequency domain samples. The assembly depends upon the configuration of the processing blocks. For example, where the processing blocks are configured in a pipelined style architecture as described above, the combiner may simply interleave the samples sequentially. Where the processing blocks are operating with an overlap, the combiner 602 may perform an averaging of overlapped samples or may decimate the samples in order to assemble the stream. Then the stream of individual frequency domain samples are sent to the I-Q demodulator 600.

For each individual frequency domain sample, e.g., f, the I-Q demodulator 600 calculates the magnitude of the individual channel using the $I_f$ and $Q_f$ components. In an embodiment for AM, the individual channel magnitude $C_f$ is determined by the formula:

$$C_f = SQRT(I_f^2 + Q_f^2)$$

After the I-Q demodulator 600 determines the individual channel magnitude, a DC offset is corrected in the DC restoration block 610.

Similarly, an alternate embodiment may demodulate FM signals. In this case the I-Q demodulator 600 would use the following formula to determine the individual channel magnitude:

$$C_f = \left(\frac{1}{\left(1 + \frac{Q_f^2}{I_f^2}\right)}\right)\left(\frac{d\left(\frac{Q_f}{I_f}\right)}{dt}\right)$$

Although some FM demodulation techniques do not ordinarily require DC restoration, it is helpful in the present invention to remove the error caused by a difference between the local timing reference and the timing reference for a particular FM station. In general, the station transmitter frequency is specified to high accuracy and the effective tuning frequency derived from the master oscillator of the receiver should be exactly equal. Any frequency error between these two sources will produce a DC term in demodulation that may be removed by the DC restoration block 610.

After DC restoration, the magnitude of the channels is measured by the post demodulation gain control 620. The post-demodulation gain control 620 may either measure individual channels, or measure multiple channels and perform a mathematical computation to determine an appropriate aggregate magnitude. In an alternative embodiment, the post-demodulation gain control 620 may make a combination of individual and multiple channel measurements. Then the post-demodulation gain control 620 may select a gain corresponding to the ratio of the magnitude measurement and a target magnitude. The post-demodulation gain control 620 may multiply the stream of individual channels by this gain and may report the measurements or selected gain or a combination of both to the digital gain control 360 via the digital gain control signal 214.

After the post-demodulation gain control 620, the stream of individual channels is sent to the sub-channel demultiplexer 630. Many individual channels may be comprised of sub-channels within the base channel. For example, in the United States, channels in the FM band include multiple sub-channels of audio signals as well as sub-channels of metadata. This metadata may include text data providing information about the audio signals on the corresponding sub-channels or other communications signals. Using the audio sub-channels of the FM band as an example, a stereo FM channel would include at least a L+R and L−R sub-channel. The sub-channel demultiplexer 630 de-multiplexes the L+R, then demodulates a pilot tone and the L−R channel using well known techniques.

The sub-channel demultiplexer 630 is also responsible for demodulating any other sub-channels in addition to audio sub-channels. These sub-channels may contain text or other information, e.g. metadata, of use to the file manager 240, or the user. After demultiplexing of all sub-channels, the sub-channel demultiplexer 630 outputs two streams. One stream includes the audio program in a demodulated aggregate of individual channels, and the other output is a stream of aggregate metadata. Both these output streams are sent to the post demultiplexer gain control 640, which may measure the magnitude of individual sub-channels, an aggregate of multiple sub-channels or a combination. The post demultiplexer gain control 640 may then select a gain based on the ratio of the magnitude measurement and a target magnitude. Any of these measurements or values may be reported to the digital gain control 360 via the digital gain control signal 214. The post demultiplexer gain control 640 may then multiply one or both streams by the gain. The demodulated aggregate of individual channels is then sent to the parallel compressor 230 via connection 225; the stream of aggregate metadata is sent directly to the file manager 240 via connection 227.

Parallel Compressor

The parallel compressor 230 receives the demodulated aggregate of individual channels from the channel extractor 200 via connection 225. The parallel compressor may also receive a stream of alternate input programs from the demultiplexer 237. The parallel compressor 230 may be activated and controlled by a compression signal 244 from the file manager 240. The file manager 240 may send such parameters such as desired compression ratio, compression technique, or disable compression in which case the demodulated aggregate of individual channels would pass through the parallel compressor unchanged. Similarly, the parallel compressor 230 can be removed from the system completely. The parallel compressor 230 may use any compression technique known in the art, including ADPCM, WMA, MPEG, and others. In one embodiment, the individual channels will be compressed in the parallel compressor 230 by use of time division multiplexing techniques. Alternate embodiments may employ parallel encoding of individual channels. A third embodiment may use a combination of time division multiplexing and parallel encoding schemes.

File Manager Architecture

Figure 7:
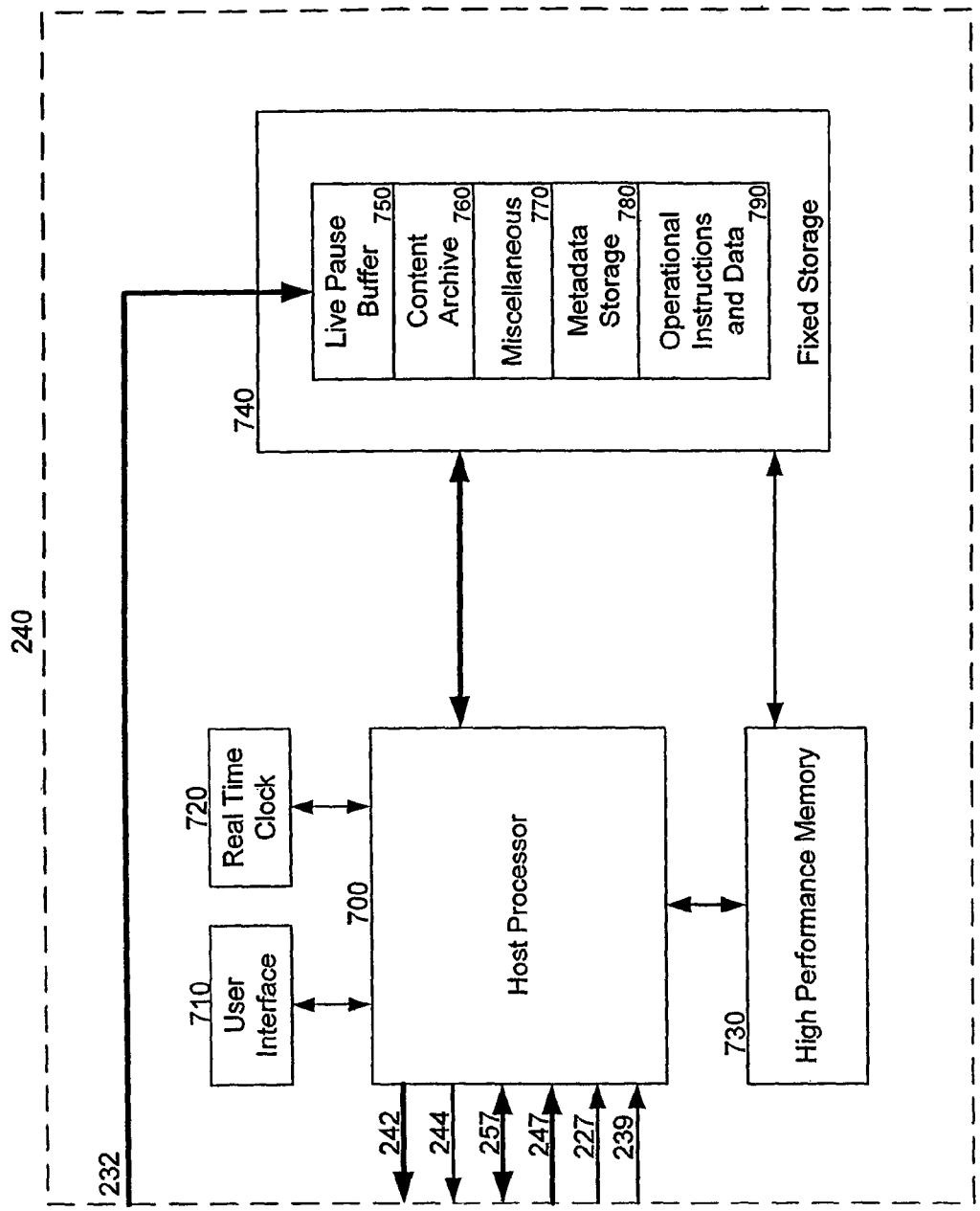
FIG. 7 is a block diagram of one embodiment of the file manager of the present invention.
Figure 7A:
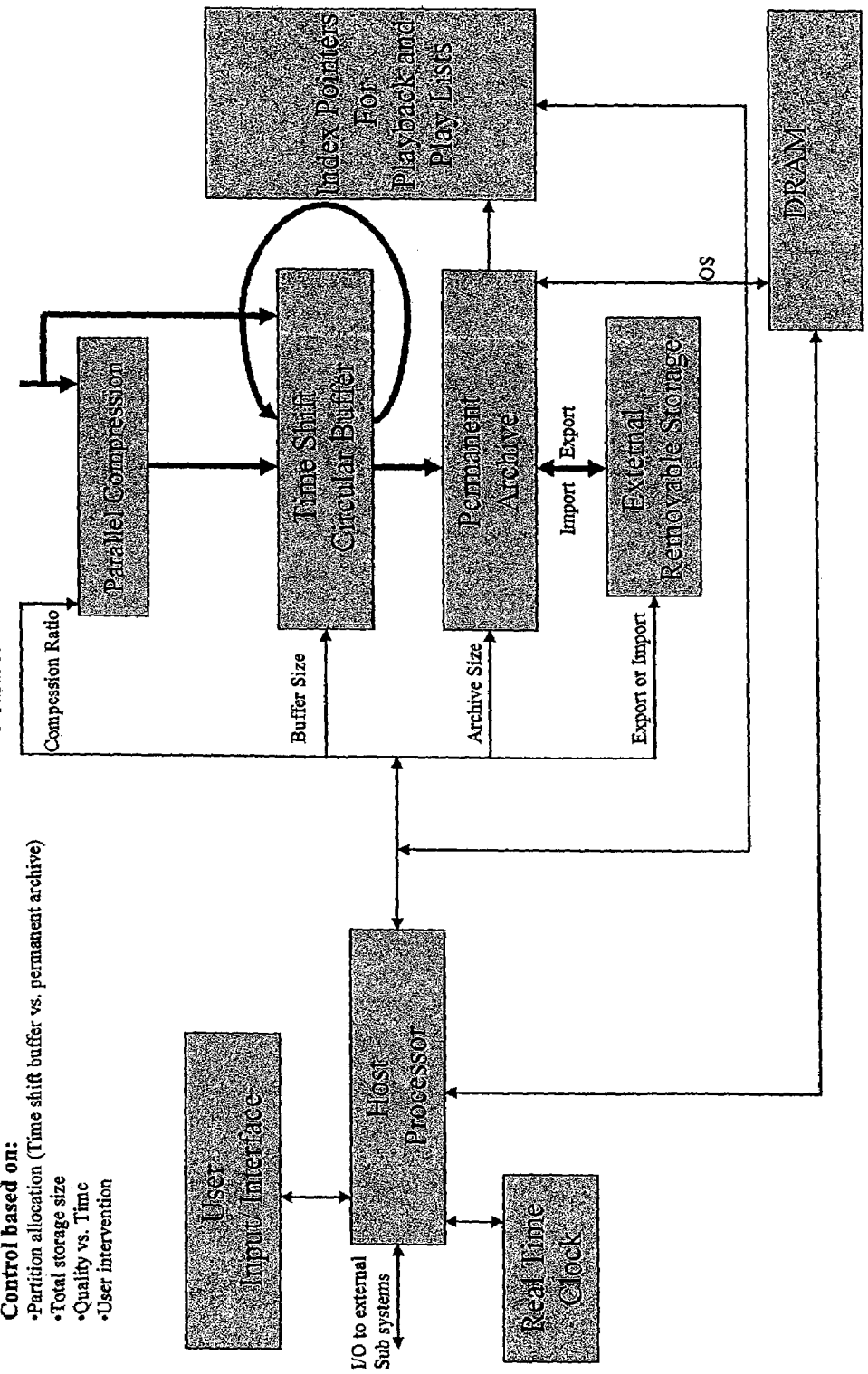
FIG. 7A is a block diagram of file manager further illustrating the flow of control signals and program content.
Figure 8:
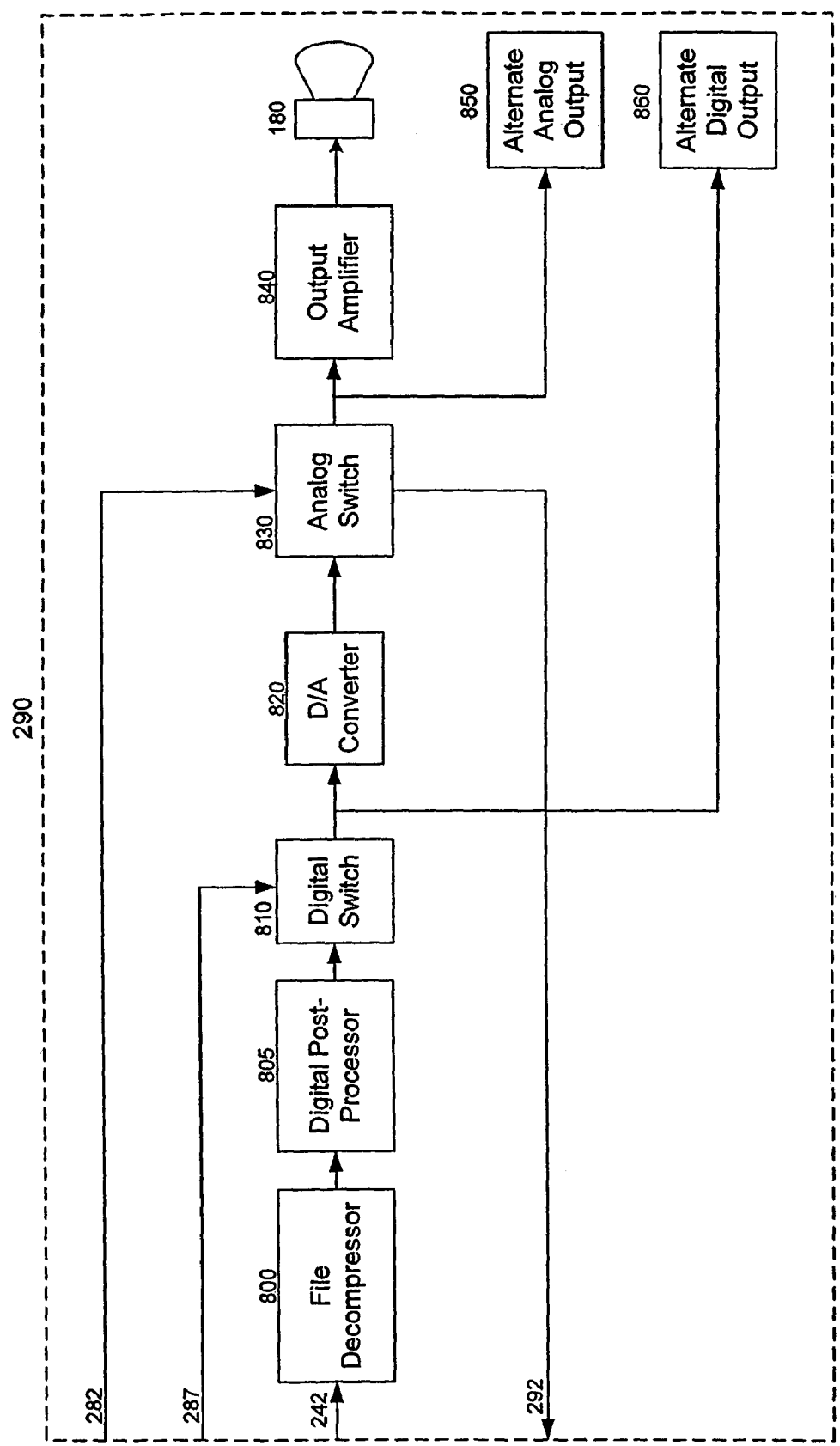
FIG. 8 is a block diagram of one embodiment of the output stage of the present invention.

Turning to FIG. 7, the file manager 240 comprises a host processor 700, a user interface 710, a real time clock 720, high performance memory 730, and fixed storage 740. In an alternative embodiment, the user interface 710 may be external to the file manager 240. The file manager 240 may be configured to accept inputs from multiple user interfaces such as user interface 710. Further, the real time clock 720 may be external to the file manager 240 in an alternative embodiment.

The fixed storage is divided into a number of sections used for different purposes. The embodiment of fixed storage 740 illustrated in FIG. 7 includes a live pause buffer 750, a content archive 760, metadata storage 780, operational instructions and data storage 790, and a section for miscellaneous storage 770. It is noted that the sectors and/or partitions of the fixed 740 and removable storage 255 may have predetermined size or may be varied.

The file manager 240 receives the stream of compressed audio channels through connection 232 and couples the stream of compressed audio channels to the fixed storage 740. The stream of compressed audio channels is coupled specifically to the live pause buffer 750 section of the fixed storage 740. The host processor 700 couples bi-directionally to the fixed storage 740, the high performance memory 730, the user interface 710, and the real time clock 720. The host processor 700 also couples to the alternate digital input stage 1 245 via connection 247, the removable storage 255 through connection 257, the channel extractor 220 through connection 227, the demultiplexer 237 through connection 239 and the output stages, e.g. output stage 1 290$a$ through output stage N 290$c$, through one or more appropriate connections 242. The host processor 700 couples to the parallel compressor via connection 244 for sending compression parameters.

File Manager Functional Description

The file manager 240 receives the stream of compressed audio channels from the parallel compressor 230. The host processor 700 identifies each program by the channel and time that program was received using the real time clock 720. The host processor 700 also receives the stream of aggregate metadata from the channel extractor via connection 227 and from the demultiplexer 237 via connection 239 associated with the stream of compressed audio channels and correlated to an external database such as a radio station's website. The host processor 700 may use this metadata for identification of each program. The user may also enter identifying information corresponding to a program or content through the user interface 710.

Additionally, where the parallel compressor 230 is not used to compress the demodulated aggregate of individual channels or the stream of alternate input programs, the file manager 240 may extract the metadata itself instead of relying on the demultiplexer 237 or the channel extractor 220 for metadata extraction. Further, the host processor 700 may use voice recognition techniques well understood in the art to identify the broadcast or content by identifying the voice itself or by recognition of the words being spoken or sung or simply to distinguish between speech and song.

The identifying information is used to create an index file that is stored separately from the actual content and programs. The index file comprises the identifying information for each program and unit of content and a corresponding pointer. The pointer indicates the point in fixed storage 740 or removable storage 255 where the program or content corresponding to the identifying information may be located.

Further, the index file may contain snippets of the stored content. These snippets may include a few seconds of the content. The snippets can be accessed and played to provide the listener with a preview of the content. This technique may be useful to the user for scrolling through a list of programs and identifying a program to playback. Similarly, the snippets may be used by the file manager to provide an automated scanning function; the file manager may play a sequence of snippets in time or channels, allowing the user to select a particular program for playback corresponding to the snippet currently being played back.

Additionally, the index file may include playlist selected by the user. A playlist is a list of content or programs that the user prefers to be played back together and in a certain order. Further, the index file may also include items that are flagged for transfer to or download from a gateway device such as a personal computer. For example, a user may flag a particularly poor quality broadcast for download in order to obtain a better quality copy from external sources such as the Internet.

The index file may also contain a list of pointers to broadcasts and content that match the description of certain categories. For example, the list may contain pointers to songs and other broadcasts involving a particular genre of music. Or, the list may contain pointers to categories of content and broadcasts such news or music. These lists may be compiled by the user, automatically compiled by the host processor 700, through a third party through the gateway device, or a combination of both.

The index file may be stored in the metadata storage 780 section of the fixed storage 740. The host processor 700 may, upon the occurrence of an event such as power-on or reset, cause the index file to be read from the fixed storage into a section of the high performance memory 730. The high performance memory may be some memory device such as DRAM that ordinarily has faster access times than the fixed storage 740. Because read and write access may be faster in the high performance memory 730 than the fixed storage 740, performance advantages will result from copying the index file and other information that will be accessed routinely by the host processor 700, such as the operational instructions and data for the host processor 700.

The channels are then stored in either fixed storage 740 or removable storage 255. Fixed storage 740 may include any type of fixed storage known in the art including, but not limited to, RAM, NVRAM, flash memory, magnetic storage such as a hard drive or tape, or optical storage. The host processor 700 may also initiate transfers of content and/or data between the fixed storage 740 and removable storage 255.

Fixed storage 740 may be partitioned into a number of sections, each section to store a different type of information, content, instructions or broadcasts. The fixed storage 740 may include a live pause buffer 750. The live pause buffer 750 is a circular time shift buffer. For example, the stream of compressed audio channels may be input directly to the live pause buffer 750 via connection 232. The live pause buffer 750 will store the stream of compressed audio channels concurrent with the broadcast of the corresponding channels. However, at some point the live pause buffer may become full. At this point, the live pause buffer may continue storing programs and content being presently broadcast by overwriting the oldest programs or content in the live pause buffer 750. The overwriting may continue indefinitely, without using any additional storage space than that originally allotted for the live pause buffer 750. For example, the live pause buffer 750 may be sized to hold two hours of broadcasts from every channel or some other user selectable amount of time. After the first two hours have been stored, the live pause buffer 750 will continue storing present broadcasts by overwriting the broadcasts that were stored two hours earlier. In this manner, the last two hours of broadcasts from every channel are available for playback at any given time.

The fixed storage 740 may also include a content archive 760. The content archive 760 may store individual programs or content from other sources for an indefinite period of time. Alternatively, the content archive 760 or pointer table entry in the index file may be configured to remove certain programs or content from the content archive 760 after a predetermined period of time elapsed. For example, the content archive 760 may be set to delete content or programs that have been in the content archive for 90 days. The content archive 760 may be used to store programs and content selected by the user for long-term storage. These may include programs and content that the user has placed in a playlist so that as long as the playlist remains active, the content or programs on the playlist will remain in the content archive 760. The content archive 760 may also be used to store content transferred from the gateway device or from a digital or analog source through the alternate digital input stage 1 245 or the ADC 235 or through the appropriate input.

The fixed storage 740 may also include a number of other areas for storing information. One area may be for storage of operational instructions and data 790. This area may be used to store the instructions and other data that the host processor 700 requires for operation of the personal radio recorder. The operational instructions and data 790 may be loaded into the high performance memory 730 upon the occurrence of some event, such as power-on or reset.

Another area may be the metadata storage 780. The metadata storage 780 may be used to store the index file and information contained in the sub-channels of various broadcast channels. The metadata area 780 may also be used to store tags and flags. Tags may be originated by a user action, whereas flags may be originated from a system level action or embedded in the program itself. Tags refer to playlists or bookmarks created by the user and are

What is claimed:

1. A system for wide-band reception and processing of signals comprising:
   a signal acquisition stage for receiving a wide-band signal comprised of a plurality of individual channels;
   a channel extractor for extracting the plurality of individual channels from the wide band signal, coupled to the signal acquisition stage;
   a file management system for managing the plurality of individual channels, coupled to the channel extractor; and,
   storage coupled to the file management system, whereby at least one of the plurality of individual channels is stored for later use,
   wherein the channel extractor further includes:
   a channel extractor input interface for selecting a plurality of time domain samples from the high-bandwidth digital data stream;
   a processing block for converting the plurality of time domain samples into a plurality of frequency domain samples, coupled to the channel extractor input interface; and, a channel assembler, for assembling the plurality of frequency domain samples into a plurality of individual channels, coupled to the processing block.

2. The system for wide-band reception and processing of signals as in claim 1, wherein the channel extractor input interface comprises:
   a sequencer for sequencing the group of time domain samples; and,
   a window multiplier for windowing the group of time domain samples, coupled to the sequencer.

3. The system for wide-band reception and processing of signals as in claim 1, wherein the processing block further comprises:
   an input buffer for temporary storage of the plurality of time domain samples; an arithmetic engine for converting the plurality of time domain samples into the plurality of frequency domain samples, coupled to the input buffer; and,
   an output buffer for temporary storage of the plurality of frequency domain samples.

4. The system for wide-band reception and processing of signals as in claim 1, wherein the channel assembler further comprises:
   a combiner for assembling the frequency domain samples into a plurality of frequency domain samples; an I-Q demodulator for demodulating the plurality of frequency domain samples into the plurality of individual channels, coupled to the combiner;
   a DC restoration stage for correcting the DC level of the plurality of individual channels, coupled to the I-Q demodulator;
   a demultiplexer for extracting at least one sub-channel from the plurality of individual channels, coupled to the DC restoration stage; and
   a gain control block for determining the gain of the signal acquisition stage, coupled to the demultiplexer.

5. A method for wide-band reception and processing of signals comprising the steps of:
   acquiring a wide-band signal from a signal acquisition stage;
   converting the wide-band signal into a high-bandwidth digital data stream;
   extracting a plurality of individual channels from the high-bandwidth digital data stream;
   managing the plurality of individual channels; and,
   storing at least one of the plurality of individual channels for later use,
   wherein the step of extracting further includes:
   receiving the a plurality of frequency domain samples from a channel extractor;
   a.) selecting an individual pair of I-Q samples from the plurality of frequency domain samples;
   b.) calculating a sample value from the individual pair of I-Q samples;
   c.) adding a DC offset to the sample value to obtain an individual channel value;
   repeating steps a-c continuously for each individual pair of I-Q samples from the plurality of frequency domain samples to create a plurality of individual channels; and
   demultiplexing at least one sub-channel from the plurality of individual channels.

6. A system for extracting a plurality of individual channels from a high-bandwidth digital data stream comprising:
   a channel extractor input interface for selecting a plurality of time domain samples from the high-bandwidth digital data stream;
   a processing block for converting the plurality of time domain samples into a plurality of frequency domain samples, coupled to the channel extractor input interface;
   a channel stream assembler, for assembling the plurality of frequency domain samples into the plurality of individual channels, coupled to the processing block; and,
   storage coupled to the channel stream assembler, whereby at least one of the plurality of individual channels is stored for later use.

7. A system for extracting a plurality of individual channels from a high-bandwidth digital data stream as in claim 6 wherein the channel extractor input interface for selecting a plurality of time domain samples from the high-bandwidth digital data stream comprises:
   a selector for selecting the plurality of time domain samples from the high-bandwidth digital data stream; and,
   a window multiplier for multiplying the plurality of time domain samples by a window function, coupled to the selector.

8. A system for extracting a plurality of individual channels from a high-bandwidth digital data stream as in claim 6 wherein the processing block for converting the plurality of time domain samples into a plurality of frequency domain samples comprises:
   an input sample buffer for temporary storage of the plurality of time domain samples;
   an arithmetic engine for performing mathematical operations on the plurality of time domain samples coupled to the input sample buffer; and
   an output sample buffer for temporary storage of the plurality of frequency domain samples.

9. A system for extracting a plurality of individual channels from a high-bandwidth digital data stream as in claim 6 wherein the channel assembler for assembling the plurality of frequency domain samples into the plurality of individual channels comprises:
   an I-Q demodulator for demodulating the plurality of frequency domain samples into the plurality of individual channels; a DC restoration stage for correcting the DC level of the plurality of individual channels, coupled to the I-Q demodulator;
   a demultiplexer for extracting at least one sub-channel from the plurality of individual channels, coupled to the DC restoration stage; and,
   a gain control block for selecting a gain for the signal acquisition stage, coupled to the demultiplexer.

10. A method for extracting a plurality of individual channels from a high-bandwidth digital data stream comprising the steps of:
    receiving a high-bandwidth digital data stream from a signal acquisition stage;
    selecting a plurality of time domain samples from the high-bandwidth digital data stream;
    converting the plurality of time domain samples into a plurality of frequency domain samples;
    demodulating the frequency domain samples into a stream of the plurality of individual channels; and,
    storing at least one of the plurality of individual channels for later use, wherein the step of demodulating further includes:
receiving the plurality of frequency domain samples from a channel extractor;
a.) selecting an individual pair of I-Q samples from the plurality of frequency domain samples;
b.) calculating an sample value from the individual pair of I-Q samples;
c.) adding a DC offset to the sample value to obtain an individual channel value; and,
repeating steps ac continuously for each individual pair of I-Q samples from the plurality of frequency domain samples to create a plurality of individual channels.

* * * * *